United States Patent Office 2,698,849
Patented Jan. 4, 1955

2,698,849

PRODUCTION OF ALKYL PYRIDINES

Robert S. Aries, New York, N. Y.

No Drawing. Application August 30, 1952,
Serial No. 307,367

6 Claims. (Cl. 260—290)

This invention relates to an improved method for the production of alkyl pyridines. More particularly it relates to the vapor phase interaction of an aliphatic aldehyde and ammonia in the presence of a highly reactive catalyst to yield valuable mixed pyridines.

Alkyl homologs of pyridine are important intermediates and solvents useful in the synthesis of antihistamines, sulfa drugs, mildew-proofing agents, antimalarials, quaternary germicides, and comonomers. The alkyl homologs of pyridine substituted in the 4 position such as gamma picoline have been used to produce isonicotinic acid which is an important intermediate in the production of drugs having antitubercular properties. The alkyl pyridines which are substituted in the 2 and 4 positions are in particular demand because they can be readily converted to corresponding vinyl analogs which are finding increasing application as comonomers in rubber and synthetic fibers.

The supply of these heterocyclic bases is essentially restricted by the volume of coal-tar production. Since these materials are byproducts, expansion in their production is limited.

Known methods for the synthesis of alkyl pyridines consist of the interaction of acetaldehyde with ammonia in the vapor phase over a dehydrating catalyst consisting largely of silica gel, alumina, or a mixture containing up to two percent alumina on silica gel. The resulting reaction has been reported to yield alpha picoline, gamma picoline, 2-methyl-5-ethyl-pyridine and a high boiling fraction known to contain pyridine compounds. The yield of alpha picoline as reported is equal to or higher than the yield of gamma picoline. Gamma picoline has become of increased commercial importance with the discovery that various derivatives of isonicotinic acid possess antitubercular properties. In addition to its increasing demand, it also commands a higher price than its isomer alpha picoline. Any process which would increase the yield of gamma picoline even at the expense of a reduced alpha picoline yield would result in a more economic operation.

The combined yield of all pyridine bases that has been reported in the literature is less than 50 percent. As a consequence, high cost products resulted making the processes uneconomical.

Therefore, it is the object of this invention to provide an economic process for the production of alkyl pyridines by the vapor phase interaction of aliphatic saturated aldehydes or polymers of aliphatic saturated aldehydes with ammonia over a catalytic mass in high yields.

It is a further object of this invention to increase the yield of the more valuable 4 substituted alkyl pyridines over the less valuable 2 substituted alkyl pyridines through the use of a specially prepared catalytic mass.

This invention is characterized by the reaction of an aldehyde or a vaporized polymer of an aldehyde and ammonia in the presence of a specially prepared highly reactive catalyst at elevated temperatures to yield mixed pyridines in high yields.

I have discovered that the use of a catalyst containing from 12 to 18 percent alumina with the balance mostly silica gel resulted in surprisingly increased yields of mixed pyridines. By using these catalysts I was able to increase the 50 percent yield that was previously reported in the literature to 80 percent. I have further discovered that by incorporating promoters in the silica-alumina composition I was able to increase the gamma picoline to alpha picoline ratio without reducing the overall yield of mixed alkyl pyridines.

The unpromoted catalyst employed in this invention is substantially alumina deposited on a silica gel base. Commercial alumina-silica gel catalysts have been found satisfactory for this purpose. The above catalyst was promoted with 0.1 to 5 per cent thorium, zirconium, and other elements from the fourth group of the periodic table of elements, and was found to be highly selective for the production of gamma picoline. A preferred range of promoter comprises 1 to 5% by weight.

To test the validity of my findings a series of controlled experiments were performed in which the only variable was the alumina to silica gel ratio in the catalyst. In this series of experiments the trimer of acetaldehyde, or paraldehyde as it is commonly called, was used. The ammonia to paraldehyde mole ratio employed was 2 to 1. No diluent was employed as in some of the previous work disclosed in the literature. The catalyst temperature was held at 425° C. The reaction gases were passed through a series of flasks cooled by a Dry Ice methanol bath. The reaction product was carefully stripped of excess ammonia and extracted with benzene. The benzene extract was carefully fractionated. The fractions obtained were identified and the yield was calculated as mole percent of theory based on the paraldehyde charged. The catalyst was prepared by impregnating freshly-acid-precipitated silica gel after thorough washing with aluminum chloride followed by precipitation of aluminum hydroxide by treatment with aqueous solution of ammonium hydroxide. The catalyst was prepared in various silica gel to alumina ratios. The following table shows the results obtained. It illustrates the superiority of catalyst composition which I have found.

| Catalyst | Yield Total Pyridines, Percent |
|---|---|
| 5% $Al_2O_3$, 95% $SiO_2$ | 49 |
| 10% $Al_2O_3$, 90% $SiO_2$ | 52 |
| 12% $Al_2O_3$, 88% $SiO_2$ | 69 |
| 15% $Al_2O_3$, 85% $SiO_2$ | 80 |
| 18% $Al_2O_3$, 82% $SiO_2$ | 73 |
| 22% $Al_2O_3$, 78% $SiO_2$ | 58 |

A second experiment was performed in the same manner illustrated above except that the 15 percent alumina on silica gel catalyst was promoted with 1 percent thorium. The following results were obtained.

|  | Promoted Catalyst | Unpromoted Catalyst |
|---|---|---|
| Alpha Picoline | 29 | 34 |
| Gamma Picoline | 38 | 32 |
| Total Pyridines | 79 | 80 |

The following examples illustrate in detail the manner in which the invention has been carried out. On reading these examples numerous variations will be apparent. As a consequence these examples are not to be construed as limitations on the scope of the patent.

*Example 1*

Paraldehyde was pumped at the rate of 6.0 grams per minute into a heated zone where it was vaporized. Ammonia gas was metered at the rate of 3.0 liters per minute measured at substantially room conditions of temperature and pressure into a heated tube where it was heated. The two gas streams were mixed and preheated to the desired catalyst temperature. This gas mixture was passed over 300 milliliters of commercial catalyst of a composition of 82% silica gel, 15% alumina and 3% thorium, maintained at 450° C. The reaction products were condensed at the temperature of Dry Ice. The resulting product was stripped of excess ammonia after which it was extracted with benzene. The benzene extract was carefully fractionated. The fractions were weighed and identified and the yield was calculated based on the paraldehyde charged. The analysis showed that the yield of alpha picoline was 34 percent, gamma picoline was 32 percent, 2-methyl-5-ethylpyridine was 10 percent and 4-methyl-3-ethylpyridine was 3 percent.

Example 2

Example 1 was repeated using acetaldehyde in place of paraldehyde. A yield of 33 percent alpha picoline, 29 percent gamma picoline, 11 percent 2-methyl-5-ethyl-pyridine and 1 percent 4-methyl-3-ethylpyridine were obtained.

I claim:

1. A process for the production of alkyl pyridines which comprises reacting ammonia with acetaldehyde in the vapor state at elevated temperatures in the presence of a catalyst comprising silica gel and 12 to 18% by weight of alumina.

2. A process for the production of alkyl pyridines which comprises reacting ammonia with a polymer of acetalydehyde in the vapor state at elevated temperatures in the presence of a catalyst comprising silica gel and 12 to 18% by weight of alumina.

3. A process for the production of gamma picoline which comprises reacting ammonia with acetaldehyde in the vapor state at a temperature of about 425° C. in the presence of a catalyst comprising silica gel, 12 to 18% by weight of alumina, and 0.1 to 5% by weight of an element of the fourth group of the periodic table of elements as promoter.

4. A process for the production of gamma picoline which comprises reacting ammonia with paraldehyde in the vapor state at a temperature of about 425° C. in the presence of a catalyst comprising silica gel, 12 to 18% by weight of alumina, and 0.1 to 5% by weight of an element of the fourth group of the periodic table of elements as promoter.

5. A process for the production of gamma picoline which comprises reacting ammonia with acetaldehyde in the vapor state at a temperature of about 425° C. in the presence of a catalyst comprising silica gel, 12 to 18% by weight of alumina, and 1 to 5% by weight of thorium as promoter.

6. A process for the production of gamma picoline which comprises reacting ammonia with paraldehyde in the vapor state at a temperature of about 425° C. in the presence of a catalyst comprising silica gel, 12 to 18% by weight of alumina, and 1 to 5% by weight of thorium as promoter.

References Cited in the file of this patent

UNITED STATES PATENTS 2,523,580   Mahan _____ Sept. 26, 1950